(12) United States Patent
Assem et al.

(10) Patent No.: US 9,386,145 B2
(45) Date of Patent: *Jul. 5, 2016

(54) MONITORING VOICE OVER INTERNET PROTOCOL (VOIP) QUALITY DURING AN ONGOING CALL

(71) Applicant: International Business Machines Corporation, Armonk, NY (US)

(72) Inventors: Haytham Assem, Dublin (IE); Jonathan Dunne, Waterford (IE); James P. Galvin, Jr., Georgetown, KY (US); Patrick J. O'Sullivan, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/609,550

(22) Filed: Jan. 30, 2015

(65) Prior Publication Data

US 2016/0028882 A1    Jan. 28, 2016

Related U.S. Application Data

(63) Continuation of application No. 14/337,457, filed on Jul. 22, 2014.

(51) Int. Cl.
*H04M 3/22* (2006.01)
*H04L 12/26* (2006.01)
(Continued)

(52) U.S. Cl.
CPC ............. *H04M 3/2227* (2013.01); *H04L 43/04* (2013.01); *H04M 3/2236* (2013.01); *H04M 3/42221* (2013.01); *H04M 7/006* (2013.01); *H04W 24/02* (2013.01)

(58) Field of Classification Search
CPC ...... G06Q 10/10; H04L 12/18; H04L 41/509; H04L 41/5009; H04L 65/00; G06F 3/165
See application file for complete search history.

(56) References Cited

U.S. PATENT DOCUMENTS 8,305,913 B2    11/2012    El-Hennawey et al.
8,432,816 B2    4/2013     Na
(Continued)

FOREIGN PATENT DOCUMENTS

CN    101437032 B    11/2011
EP    1573435 B1     1/2012
WO    2013101881 A1  7/2013

OTHER PUBLICATIONS

Assem et al. "Monitoring VoIP Call Quality Using Improved Simplified E-model," Jan. 31, 2013, IEEE.*
(Continued)

*Primary Examiner* — Jae Y Lee
(74) *Attorney, Agent, or Firm* — Ryan Lewis; Arnold B. Bangali (57) ABSTRACT

A method for calculating a mean opinion score (MOS) during an ongoing Voice over Internet Protocol (VoIP) call is provided. The method may include determining a time delay between a VoIP source and a VoIP destination connected by a communications network. A start recording message is sent from the VoIP source to the VoIP destination. A first recorded call sample from the VoIP source and a second recorded call sample from the VoIP destination are generated, whereby the first and the second recorded call sample are generated with a recording delay value corresponding the determined time delay for synchronizing the first and the second recorded call sample. Using an intrusive call quality measurement, a first MOS value is calculated based on the first and the second recorded call sample. Using a non-intrusive call quality measurement, a second MOS value is calculated based on the first MOS value.

7 Claims, 6 Drawing Sheets

(51) Int. Cl.
*H04W 24/02* (2009.01)
*H04M 3/42* (2006.01)
*H04M 7/00* (2006.01)

(56) References Cited

U.S. PATENT DOCUMENTS

| | | | |
|---|---|---|---|
| 8,559,320 B2 | 10/2013 | Khanduri | |
| 2004/0215448 A1 | 10/2004 | Funatsu et al. | |
| 2012/0020484 A1* | 1/2012 | Grancharov | H04M 3/2236 381/56 |
| 2012/0281589 A1 | 11/2012 | Ozawa | |
| 2015/0113063 A1* | 4/2015 | Liu | H04L 65/403 709/204 |

OTHER PUBLICATIONS

Assem et al. ("Monitoring VoIP Call Quality Using Improved Simplified E-model," Jan. 31, 2013, IEEE.*

Beuran et al. "User-Perceived Quality Assessment for VoIP Applications," Jan. 24, 2004, CERN.*

IBM: List of IBM Patents or Patent Applications Treated as Related (Appendix P), Dated Mar. 3, 2015.

U.S. Appl. No. 14/337,457, filed Jul. 22, 2014, Entitled: "Monitoring Voice Over Internet Protocol (VoIP) Quality During an Ongoing Call".

Waltermann et al., "Extension of the E-Model Towards Super-Wideband Speech Transmission", 2010 IEEE, Quality and Usability Lab, Deutsche Telekom Laboratories, TU Berlin, Germany, pp. 4654-4657.

Walker, "Assessing VoIP Call Quality Using the E-model", NetIQ Corporation, pp. 1-7.

http://www.technology-training.co.uk/voicequalitymeasurement_39.php, "Voice Quality Measurement", Technology Training Limited, pp. 1-4, printed Jun. 10, 2014.

Pending U.S. Appl. No. 14/337,457, filed Jul. 22, 2014, entitled, "Monitoring Voice Over Internet Protocol (VoIP) Quality During an Ongoing Call".

IBM: List of IBM Patents or Patent Applications Treated as Related (Appendix P), Mar. 15, 2016, pp. 1-2.

U.S. Appl. No. 15/061,279, filed Mar. 4, 2016, entitled: "Monitoring Voice Over Internet Protocol (VoIP) Quality During an Ongoing Call", pp. 1-30.

* cited by examiner

MONITORING VOICE OVER INTERNET PROTOCOL (VOIP) QUALITY DURING AN ONGOING CALL

BACKGROUND

The present invention generally relates to Voice over Internet Protocol (VoIP), and more particularly, to monitoring the quality of VoIP calls.

VoIP may include technologies for voice communications utilizing a variety of networks, such as the Internet, and network protocols, such as Internet Protocol (IP). For decades, entities such as phone companies have used, among other criteria, Mean Opinion Score (MOS) as a subjective but potentially expensive measure of phone call quality. However, such entities may be able to objectively estimate MOS through at least one of several computational tests. These tests can include non-intrusive computational methods (e.g., E-Model: Electronic Model) that may be able to be performed during an ongoing call (i.e., on-line or live) over a communications network. Alternatively, intrusive tests (e.g., PSQM: perceptual speech quality measure) may be utilized to establish a comparison between a voice signal captured at the sender location and a degraded voice signal captured at the receiver location. However, the intrusive test may typically be carried out in an off-line environment (e.g., laboratory) as opposed to during an ongoing live call.

BRIEF SUMMARY

According to one exemplary embodiment, an enhancement to monitoring the quality of live ongoing calls may include applying a two-stage algorithmic analysis during a VoIP call between two locations over a communications network.

According to another exemplary embodiment, a method for calculating a mean opinion score (MOS) during an ongoing Voice over Internet Protocol (VoIP) call is provided. The method may include determining a time delay between a VoIP source device at a first location and a VoIP destination device at a second location, whereby the first and the second VoIP device are connected by a communications network. A start recording message is sent from the VoIP source device to the VoIP destination device. A first recorded call sample from the VoIP source device and a second recorded call sample from the VoIP destination device are generated, whereby the first recorded call sample and the second recorded call sample are generated with a recording delay value corresponding the determined time delay for synchronizing the first and the second recorded call sample. Using an intrusive call quality measurement, a first MOS value is calculated, whereby the first MOS value is based on the first and the second recorded call sample. Using a non-intrusive call quality measurement, a second MOS value is calculated, whereby the second MOS value is calculated based on the first MOS value.

According to another exemplary embodiment, a computer program product for monitoring a voice over internet protocol (VoIP) call over a communications network is provided. The computer program product may include a computer-readable storage device and program instructions stored on one or more tangible storage devices. The program instructions are executable by a processor for performing a method that may accordingly include determining a time delay between a call sender at a first location on the communications network and a call receiver at a second location on the communications network. A first portion of the VoIP call signal originating from the call sender and a second portion of the VoIP call signal at the call receiver are recorded. The first recorded portion is synchronized with the second recorded portion to correspond to a common call segment associated with the VoIP call between the call sender and the call receiver, whereby the first recorded portion is synchronized with the second recorded portion based on the determined time delay. An intrusive call quality measurement is applied to the first and the second recorded portion for generating a first output corresponding to the intrusive call quality measurement. A non-intrusive call quality measurement is applied for generating a second output based on receiving the first output corresponding to the intrusive call quality measurement and the determined time delay associated with the communications network.

According to another exemplary embodiment, a computer system for monitoring a voice over internet protocol (VoIP) call over a communications network is provided. The computer system may include one or more processors, one or more computer-readable memories, one or more computer-readable tangible storage devices, and program instructions stored on at least one of the one or more storage devices for execution by at least one of the one or more processors via at least one of the one or more memories. The computer system is capable of performing a method that may accordingly include determining a time delay between a call sender at a first location on the communications network and a call receiver at a second location on the communications network. A first portion of the VoIP call signal originating from the call sender and a second portion of the VoIP call signal originating from the call receiver are recorded. The first recorded portion is synchronized with the second recorded portion to correspond to a common call segment associated with the VoIP call between the call sender and the call receiver, whereby the first recorded portion is synchronized with the second recorded portion based on the determined time delay. An intrusive call quality measurement is applied to the first and the second recorded portion for generating a first output corresponding to the intrusive call quality measurement. A non-intrusive call quality measurement is applied for generating a second output based on receiving the output corresponding to the intrusive call quality measurement and the determined time delay associated with the communications network.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The one or more exemplary embodiments described herein provide an enhancement to monitoring the quality of live ongoing calls. In particular, a two-stage algorithmic analysis is carried out during a VoIP call between two locations over a communications network. In the area of VoIP, for example, call quality can be measured using either on-line, non-intrusive measurement algorithms (e.g., E-model) or off-line, intrusive measurement algorithms (e.g., POLQA) for the purpose of, among other things, estimating a metric (e.g., MOS) for evaluating call quality over data networks. Generally, on-line non-intrusive measurement algorithms (e.g., E-model) may determine MOS values that may reflect estimates of VoIP call quality over a network. Alternative, off-line intrusive measurement algorithms (e.g., POLQA) enable a substantially accurate MOS determination. However, these off-line intrusive measurement algorithms may not be used during live calls. The one or more described exemplary embodiments provide, among other things, a MOS determination process that is both accurate and live (i.e., able to be used during an ongoing VoIP call).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1A:
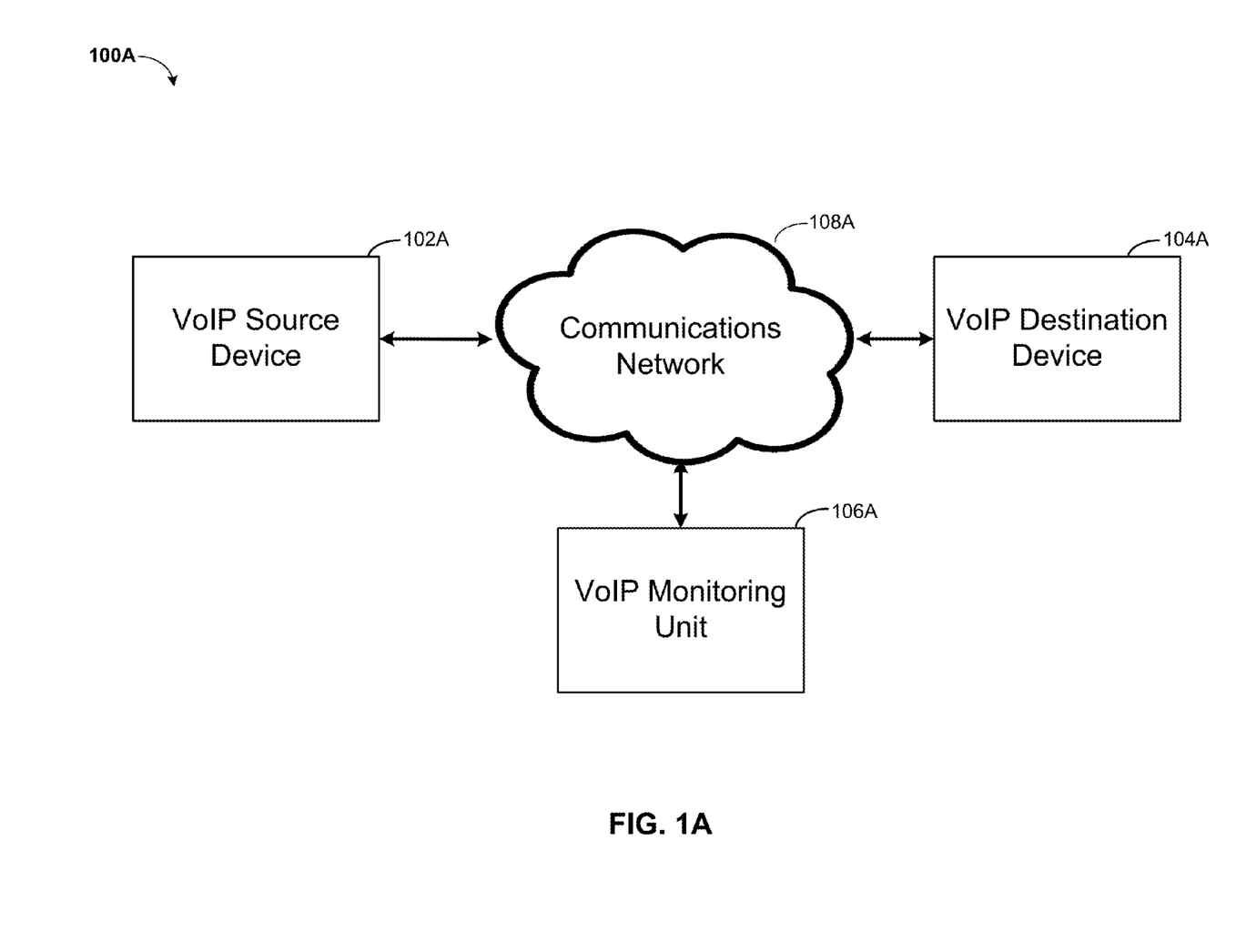
FIG. 1A is a system block diagram of a VoIP call quality monitoring system according to one exemplary embodiment.

Referring to FIG. 1A, a system block diagram of a VoIP call quality monitoring system 100A according to one exemplary embodiment is depicted. The call quality monitoring system 100A may include a VoIP source device 102A (e.g., a computer, a telephone) and a VoIP destination device 104A (e.g., a computer, a telephone) that may be connected by a communications network 108A (e.g., Internet Protocol (IP) network). As depicted, a VoIP monitoring unit 106A (e.g., a computer or processing device) may be connected to the communications network 108A to receive inputs from the VoIP source device 102A and the VoIP destination device 104A. The VoIP monitoring unit 106A may calculate, for example, a call quality output score (e.g., MOS) from inputs received from the VoIP source device 102A, the VoIP destination device 104A, and the communications network 108A.

Figure 1B:
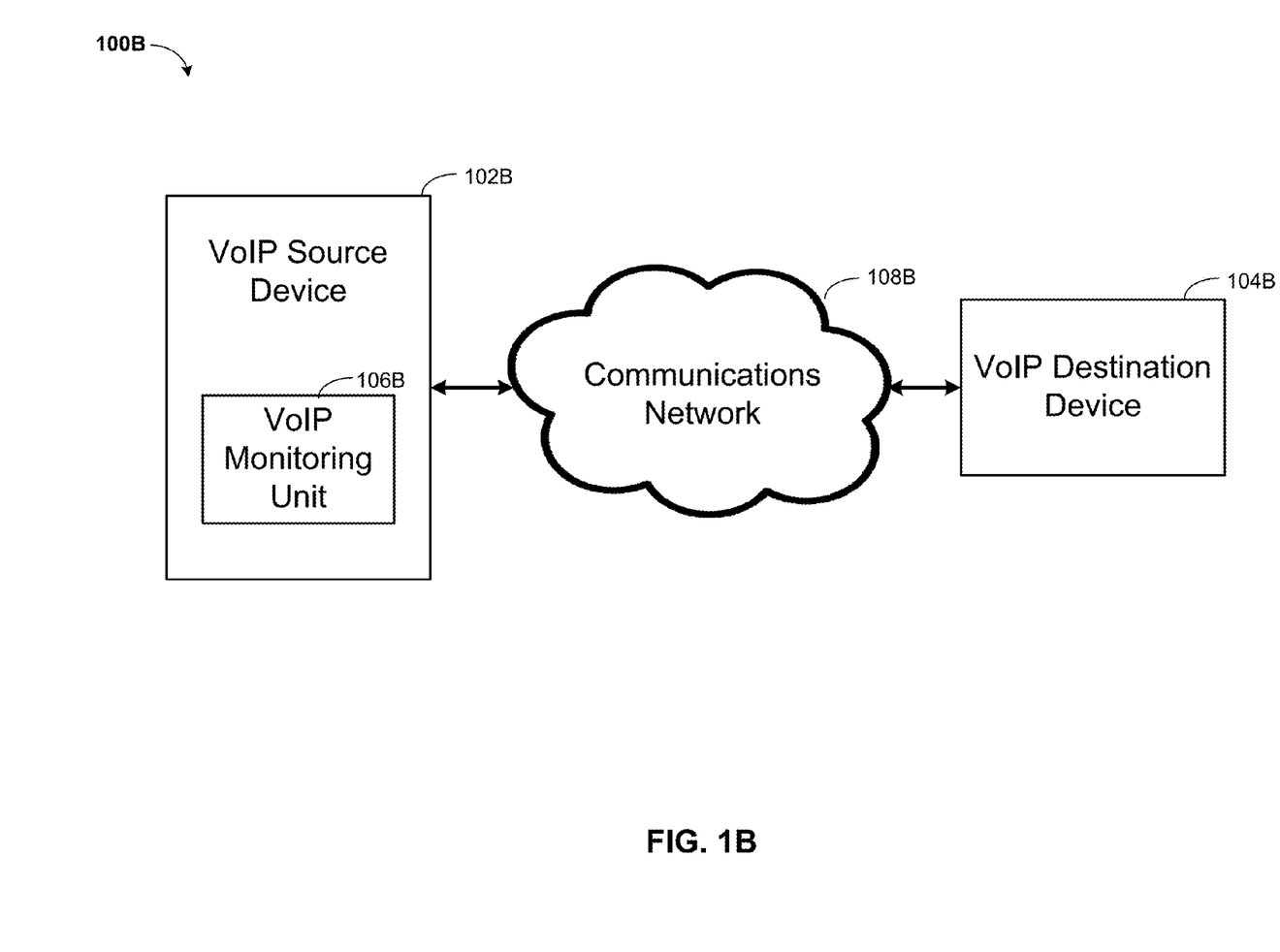
FIG. 1B is a system block diagram of a VoIP call quality monitoring system according to another exemplary embodiment.

FIG. 1B depicts a system block diagram of a VoIP call quality monitoring system 100B according to the alternative exemplary embodiment. The VoIP call quality monitoring system 100B may include a VoIP source device 102B (e.g., a computer) and a VoIP destination device 104B (e.g., a computer) that may be connected by a communications network 108B (e.g., Internet Protocol (IP) network). As depicted, a VoIP monitoring unit 106B may exist as a component within the VoIP source device 102B. The VoIP monitoring unit 106B may calculate, for example, a call quality output score (e.g., MOS) from inputs received from the VoIP source device 102B, the VoIP destination device 104B, and the communications network 108B. It may be appreciated that VoIP monitoring unit 106A (FIG. 1A) and VoIP monitoring unit 106B are substantially identical or similar, such that any description of VoIP monitoring unit 106A may also apply to VoIP monitoring unit 106B. However, as depicted and described above, the location of the VoIP monitoring units 106A, 106B may differ according to networking preferences and architecture.

Figure 2:
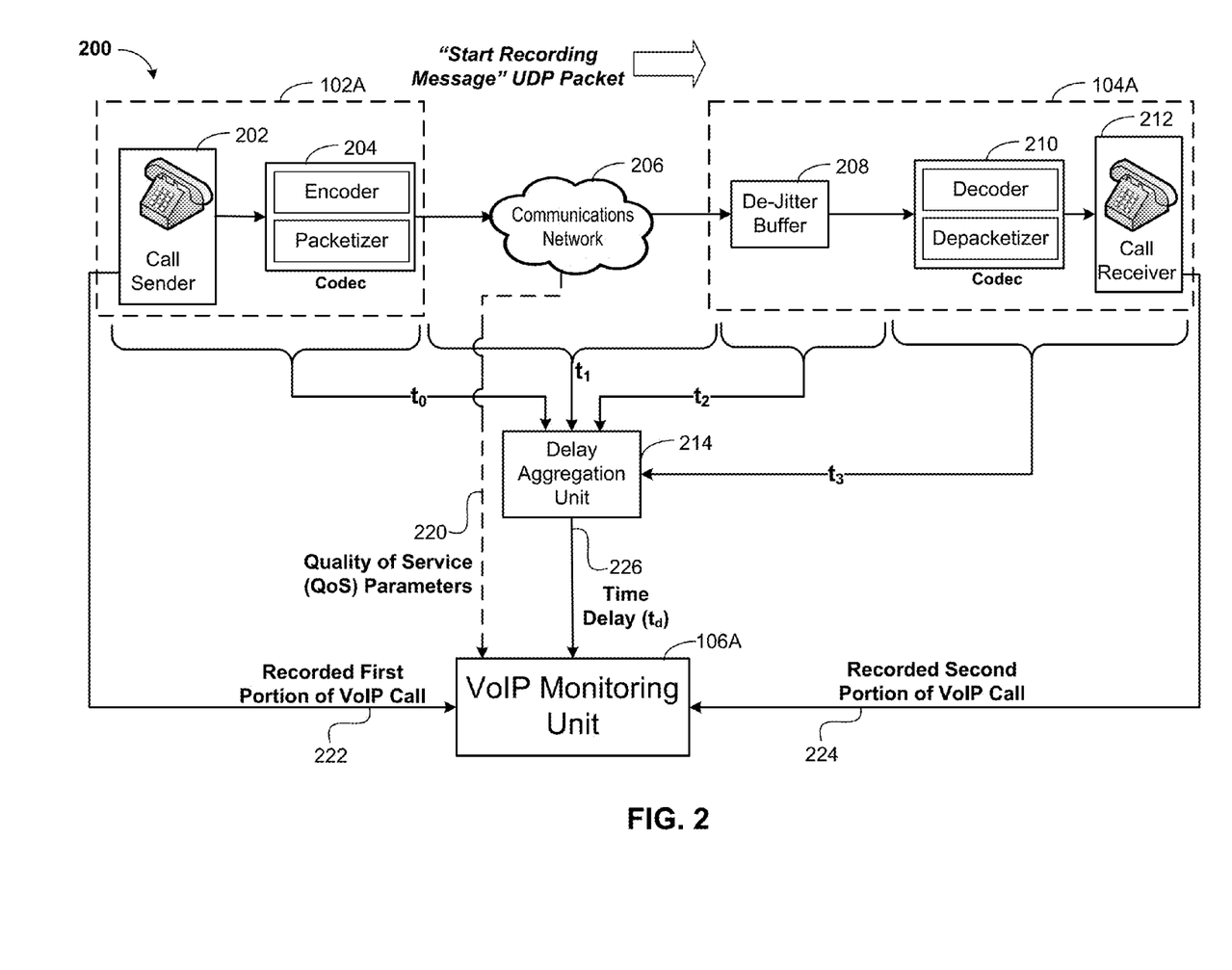
FIG. 2 is an exemplary system architecture corresponding to the VoIP call quality monitoring system of FIG. 1A.

Referring to FIG. 2, an exemplary system architecture 200 corresponding to a VoIP call quality monitoring system 100A (FIG. 1A) is depicted. As illustrated, the system architecture 200 may include a call sender 202 (e.g., telephone, computer), a compression codec 204, a communications network 206 (e.g., IP network), a de-jitter buffer 208, a decompression codec 210, a call receiver 212 (e.g., telephone, computer), a delay aggregation unit 214 (e.g., adder), and a VoIP monitoring unit 106A.

The call sender 202 and the compression codec 204 may, for example, be encapsulated within a VoIP source device 102A (FIG. 1A). Similarly, the de-jitter buffer 208, the decompression codec 210, and the call receiver 212 may be encapsulated, for example, within a VoIP destination device 104A (FIG. 1A). It may be appreciated that by further encapsulating the VoIP monitoring unit 106A within the VoIP source device 102A, a system architecture for VoIP source device 102B (FIG. 1B) may be described. Furthermore, it may be appreciated that the system architecture for VoIP destination device 104A may be used to describe a system architecture for VoIP destination device 104B (FIG. 1B).

In a call scenario, the call sender 202 may capture voice data, which may be encoded and packetized by the compression codec 204. The voice data may then be transmitted via the communications network 206 to the call receiver 212. Prior to the call receiver 212 playing back the transmitted voice data received from the call sender 202, the transmitted voice data may be subjected to de-jittering by de-jitter buffer 208. Subsequently, the de-jittered transmitted voice data may be decoded and depacketized by the decompression codec 210. Upon decompression, the decoded and depacketized voice data may be played back by the call receiver 212.

During an established call between call sender 202 and call receiver 212, a portion of the call is recorded at both the call sender 202 and the call receiver 212 in a synchronized manner. The synchronized recording ensures that the call sender 202 and the call receiver 212 capture and record the same segment or portion of the call. For example, if the segment of the call includes voice data associated with the phrase "hello mother" generated by the call sender 202, the same segment at the call receiver 212 will accordingly be the same generated "hello mother" phrase. A "Start Recording Message" command encapsulated within a user datagram protocol (UDP) packet is sent from the call sender 202 to the call receiver 212 over the communications network 206 for the purpose of facilitating the synchronized recording. The call receiver 212 may begin recording a portion of the call (e.g., received "hello mother" phrase) upon receiving the "Start Recording Message" UDP packet. Also, upon sending the "Start Recording Message" UDP packet, the call sender 202 begins recording the portion of the call (e.g., generated "hello mother" phrase). Thus, the recording times at the call sender 202 and call receiver 212 are synchronized to capture the same call segment (e.g., "hello mother" phrase). Accordingly, the first recorded VoIP call and the second recorded VoIP call are synchronized based on a time delay value $t_d$ associated with voice packets being transmitted between the call sender 202 and the call receiver 212. Since the "Start Recording Message" command is subject to the same delay (e.g., $t_d$) as the voice data sent between the call sender 202 and the call receiver 212, substantially identical call segments or portions (e.g., "hello mother") are recorded.

A delay aggregation unit 214 (e.g., an adder) may be used to determine the time delay value $t_d$ between the call sender 202 and the call receiver 212 connected across the communications network 206. The delay aggregation unit 214 may, therefore, determine any accumulated delays encountered by VoIP packets between the call sender 202 and call receiver 212. The time delay value $t_d$ may include an aggregate value corresponding to a capture and encoding delay $t_0$ associated with call sender 202 and compression codec 204, a propagation delay $t_1$ associated with communications network 206, a de-jitter buffer delay $t_2$ associated with de-jitter buffer 208, and a decoding and playback delay $t_3$ associated with decompression codec 210 and call receiver 212. As depicted, the delay aggregation unit 214 may include a networked device in communication with various other network elements (e.g., Codecs, network monitoring software, de-jitter buffers, etc.) via communications network 206. In alternative implementations, the delay aggregation unit 214 may reside within, for example, VoIP monitoring unit 106A.

The VoIP monitoring unit 106A may be connected to the call sender 202, the communications network 206, the call receiver 212, and the delay aggregation unit 214. The VoIP monitoring unit 106A may receive a first recorded portion of the VoIP call (e.g., generated "hello mother" phrase) from the call sender 202 over data link 222. Similarly, the VoIP monitoring unit 106A may receive a second recorded portion of the VoIP call (e.g., received "hello mother" phrase) from the call receiver 212 over data link 224. The VoIP monitoring unit 106A may optionally receive quality of service (QoS) parameters (e.g., packet loss, jitter) from the communications network 206 over data link 220. As described in the following paragraphs, QoS parameters may not be necessary for determining voice quality based on the two-stage algorithmic processing carried out. The depicted dashed lines are indicative of an optional or conventional use of the QoS parameters when, for example, only a conventional single non-intrusive call quality measurement is made. The VoIP monitoring unit 106A may further receive time delay value $t_d$ from the delay aggregation unit 214 over data link 226. The VoIP monitoring unit 106A may be implemented as software, hardware, firmware, or any combination thereof. Furthermore, as previously indicated, the delay aggregation unit 214 and the VoIP monitoring unit 106A may be encapsulated within a single unit. For data links 220, 222, 224, and 226, any desired medium (e.g., wireless or wired) or protocol (e.g., IP or Transmission Control Protocol) may be used. Accordingly, the VoIP monitoring unit 106A processes the received first and the second recorded portion of the VoIP call (i.e., common call segment), the received QoS parameters, and the received time delay value $t_d$ in order to determine the call quality of a VoIP call between the call sender 202 and the call receiver 212. An exemplary VoIP monitoring unit 106A is illustrated and described in relation to FIG. 3. For example, the first recorded portion of the VoIP call (e.g., generated "hello mother" phrase) originating from the call sender 202, and the second recorded portion of the VoIP call (e.g., received "hello mother" phrase) generated at call receiver 212, may be sent along respective data links 222 and 224 using any lossless protocol such as Transmission Control Protocol (TCP).

In operation, the call sender 202 may be used to capture call voice data and convert the call voice data to a digital waveform. The compression codec 204 may encode this voice data into a series of data packets that may be more easily sent over existing communications standards, such as TCP, UDP, or Internet Protocol (IP). The packetization of the call voice data would be subject to the capture and packetization to delay based on the type of codec used for compression, where value of $t_0$ may be the amount of time taken for call voice data to be captured by the call sender 202 and encoded and packetized by the compression codec 204. After compression by the compression codec 204, the voice data packets would be transmitted over a communications network 206 that may use a UDP protocol. The transmitted voice data packets may be subjected to the propagation delay $t_1$, where value of $t_1$ may be the amount of time taken for a voice data packet to be sent from the compression codec 204 and received by the de-jitter buffer 208 over the communications network 206.

The de-jitter buffer 208 may receive the voice data packets from the communications network 206 and artificially add a delay value $t_2$ to minimize the variance in voice data packet arrival times. The de-jittered voice data packets may then be de-packetized by the decompression codec 210 to convert the packetized digital waveform into raw digital data that can be converted to an analog signal and played back by the call receiver 212. This conversion from voice data packets to analog voice signal may be subjected to the depacketization and playback delay $t_3$, where the value of $t_3$ corresponds to an amount of time needed for the decompression codec 210 to decode and depacketize the voice data packets into raw digital data.

Figure 3:
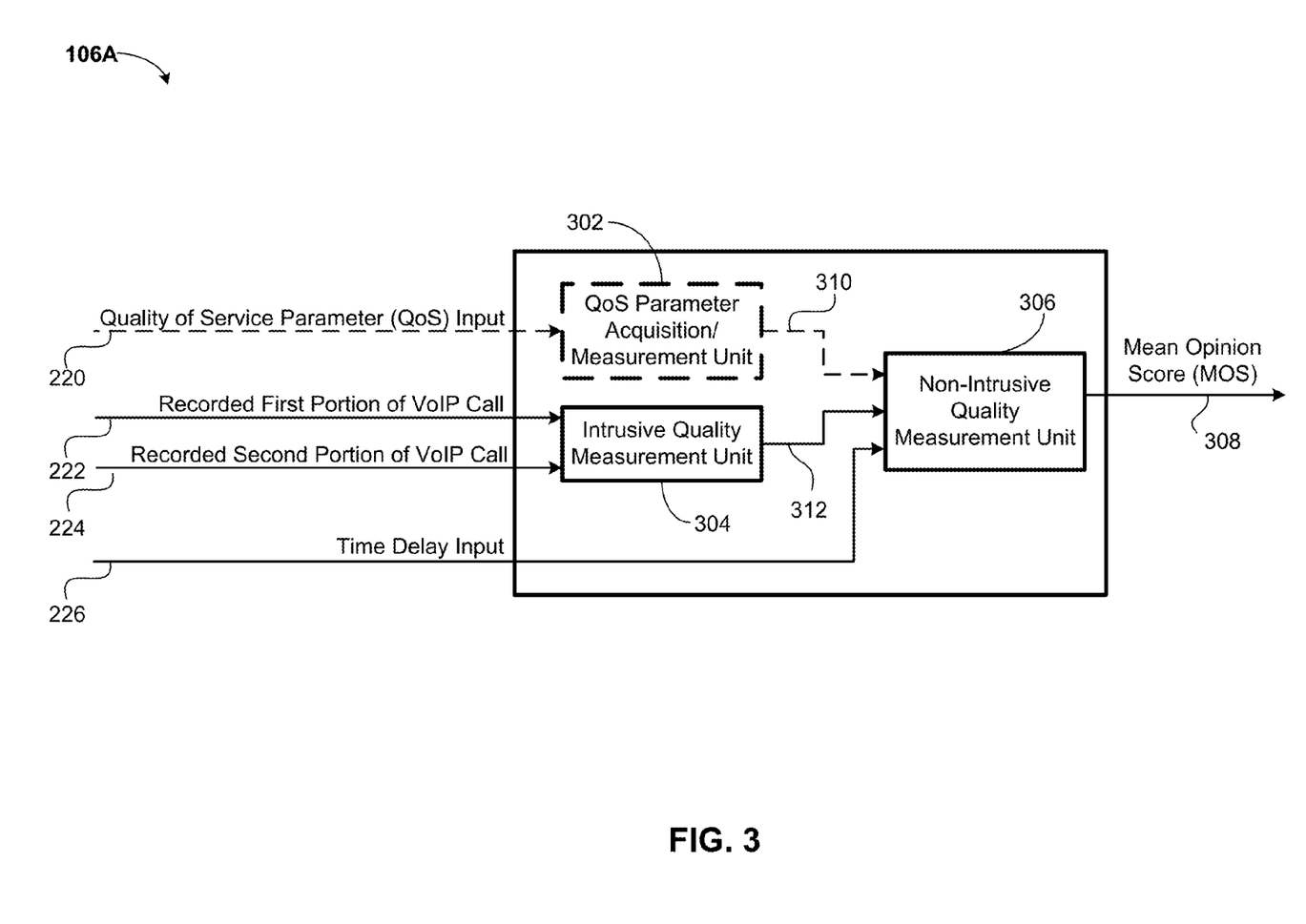
FIG. 3 is an exemplary block diagram of the VoIP monitoring unit utilized within the system architecture diagram of FIG. 2.

FIG. 3 is an exemplary block diagram of the VoIP monitoring unit 106A utilized within the system architecture diagram 200 of FIG. 2. As depicted, the VoIP monitoring unit 106A may include an optional quality of service (QoS) parameter acquisition and measurement unit 302, an intrusive quality measurement unit 304, and a non-intrusive quality measurement unit 306.

As indicated above, the QoS parameters may not be necessary for determining voice quality based on the two-stage algorithmic processing carried out according to one or more exemplary embodiments described herein. The depicted dashed lines are indicative of an optional or conventional use of the QoS parameters when, for example, only a conventional single non-intrusive call quality measurement is made. Accordingly, an optional QoS parameter acquisition and measurement unit 302 may determine a variety of QoS parameters corresponding to a network such as communications network 206 (FIG. 2). The QoS parameters may include a packet loss determination and a jitter determination that are received from the communications network 206 (FIG. 2.) via optional data link 220. The acquired QoS parameters may be sent from the QoS parameter acquisition and measurement unit 302 to the non-intrusive quality measurement unit 306 via optional data link 310. According to one implementation, the QoS parameter acquisition and measurement unit 302 polls QoS parameters from the communications network 206 (FIG. 2). According to an alternative implementation, the QoS parameter acquisition and measurement unit 302 may include network monitoring software that, at least in part, generates the QoS parameters.

The intrusive quality measurement unit 304 may, for example, calculate a first mean opinion score (MOS) for VoIP call quality using an intrusive call quality algorithm such as a perceptual speech quality measure (PSQM) algorithm, a perceptual evaluation of speech quality (PESQ) algorithm, or a perceptual objective listening quality assessment (POLQA) algorithm. The intrusive quality measurement unit 304 may calculate the first MOS using a first recorded portion of a VoIP call generated by call sender 202 (FIG. 2) and a second recorded portion of a VoIP call generated by call receiver 212 (FIG. 2). The first and the second recorded portion of the VoIP call may be input to the intrusive quality measurement unit 304 using respective data links 222 and 224 (also see FIG. 2.). The intrusive quality measurement unit 304 may analyze a synchronized common call segment (e.g., "hello mother") corresponding to the first and the second recorded portion of the VoIP call and evaluate characteristics of the synchronized common call segment using an intrusive call quality algorithm in order to generate a first MOS. The first MOS may then be sent by the intrusive quality measurement unit 304 to the non-intrusive quality measurement unit 306 via data link 312.

The non-intrusive quality measurement unit 306 may, for example, calculate a second MOS for VoIP call quality measurement using a non-intrusive call quality algorithm (e.g., E-model). The non-intrusive quality measurement unit 306 may receive the first MOS generated by the intrusive quality measurement unit 304 as an input for the non-intrusive call quality algorithm via data link 312. The non-intrusive quality measurement unit 306 may also receive the time delay input $t_d$ from the delay aggregation unit 214 (FIG. 2) via data link 226. The non-intrusive quality measurement unit 306 may output a second MOS for monitoring VoIP call quality via data link 308. The second MOS on data link 308 may be utilized as a final MOS for the VoIP call. Accordingly, the final MOS provides a call quality measure that depends on one MOS calculation (i.e., first stage) being used to generate another MOS (i.e., second stage). Thus, the two-stage MOS calculation provided by the intrusive quality measurement unit 304 (i.e., first stage) and the non-intrusive quality measurement unit 306 (i.e., second stage) mitigates the need for processing QoS parameters at the second stage non-intrusive quality measurement unit 306. This occurs as a result of the first stage processing provided by intrusive quality measurement unit 304 inherently considering QoS parameters such as jitter and packet loss. The inherent QoS considerations stem from the intrusive quality measurement unit 304 comparing common voice data at separate locations (i.e., sender 202 and receiver 212) on the communications network 206. Thus, packet loss and jitter effects are reflected in the compared voice data.

Figure 4:
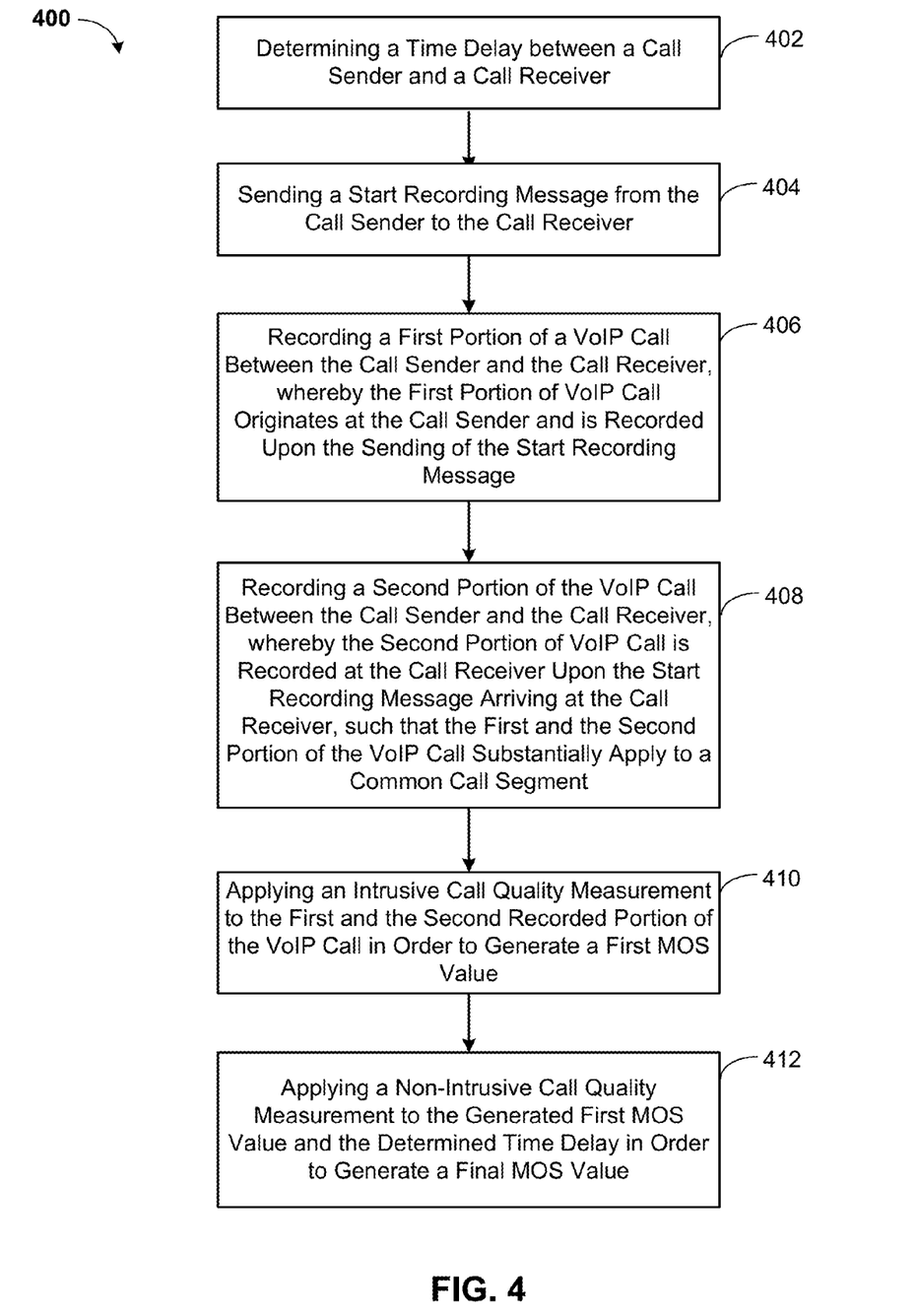
FIG. 4 is an operational flow chart corresponding to a VoIP quality monitoring (VQM) program according to an exemplary embodiment.

FIG. 4 is an operational flow chart corresponding to a VoIP quality monitoring program 400 corresponding to the exemplary embodiment depicted in FIG. 2. The VoIP quality monitoring program 400 of FIG. 4 is described with the aid of the exemplary embodiments of FIGS. 2 and 3.

At 402, a time delay value between a call sender and a call receiver is determined. For example, a delay aggregation unit 214 (FIG. 2) such as an adder may determine a time delay value $t_d$ between a call sender 202 (FIG. 2) and a call receiver 212 (FIG. 2) connected across a communications network 206 (FIG. 2). The delay aggregation 214 unit may determine an aggregate value corresponding to the capture and encoding delay $t_0$ associated with call sender 202 and compression codec 204 (FIG. 2), the propagation delay $t_1$ associated with communications network 206, the de-jitter buffer delay $t_2$ associated with de-jitter buffer 208 (FIG. 2), and the decoding and playback delay $t_3$ associated with decompression codec 210 (FIG. 2) and call receiver 212.

At 404, a start recording message is sent from the call sender to the call receiver. For example, the call sender 202 may send a "Start Recording Message" packet over the communications network 206 to the call receiver 212. This "Start Recording Message" may be of any protocol, such as UDP.

At 406, a first portion of a VoIP call between the call sender and the call receiver is recorded. The first portion of the VoIP call originates at the call sender and is recorded upon the sending of the start recording message. For example, once the "Start Recording Message" UDP packet is sent by the call sender 202 to the call receiver 212, the call sender 202 beings to record a first portion of the ongoing VoIP call (e.g., generated "hello mother" phrase) between the call sender 202 and the call receiver 212.

At 408, a second portion of the VoIP call between the call sender and the call receiver is recorded. The second portion of VoIP call is recorded at the call receiver upon the start recording message arriving at the call receiver, such that the first and the second portion of the VoIP call substantially apply to a common call segment. For example, once the "Start Recording Message" UDP packet is received by the call receiver 212, the call receiver 212 beings to record a second portion of the ongoing VoIP call (e.g., received "hello mother" phrase) between the call sender 202 and the call receiver 212. This second portion of the ongoing VoIP call may correspond to a common segment of the ongoing VoIP call, such that the first portion recorded by the call sender 202 and the second portion recorded by the call receiver 212 are substantially the same.

At 410, an intrusive call quality measurement is applied to the first and the second recorded portion of the VoIP call in order to generate a first MOS value. For example, once the first recorded portion of the VoIP call is obtained by the call sender 202 and the second recorded portion of the VoIP call is obtained by the call receiver 212, an intrusive call quality measurement algorithm (e.g., POLQA) is applied by the intrusive quality measurement unit 304 (FIG. 3). The intrusive quality measurement unit 304 may receive the first recorded portion of the VoIP call from the call sender 202 (FIG. 2) over data link 222 (FIG. 3) and the second recorded portion of the VoIP call from the call receiver 212 (FIG. 2) over data link 224 (FIG. 3). The intrusive quality measurement unit 304 may then generate a first MOS, corresponding to the first and the second recorded portion of the VoIP call.

At 412, a non-intrusive call quality measurement is applied to the generated first MOS and the determined time delay to generate a final MOS value. For example, the non-intrusive quality measurement unit 306 (FIG. 3) may receive the first generated MOS from the intrusive quality measurement unit 304 (FIG. 3) via data link 312 (FIG. 3). The non-intrusive quality measurement unit 306 may also receive the time delay value $t_d$ from the delay aggregation unit 214 (FIG. 2) via data link 226 (FIG. 3). The non-intrusive quality measurement unit 306 may then output a second MOS value corresponding to the first MOS value, the delay $t_d$, and the QoS parameters over data link 308 (FIG. 3).

Figure 5:
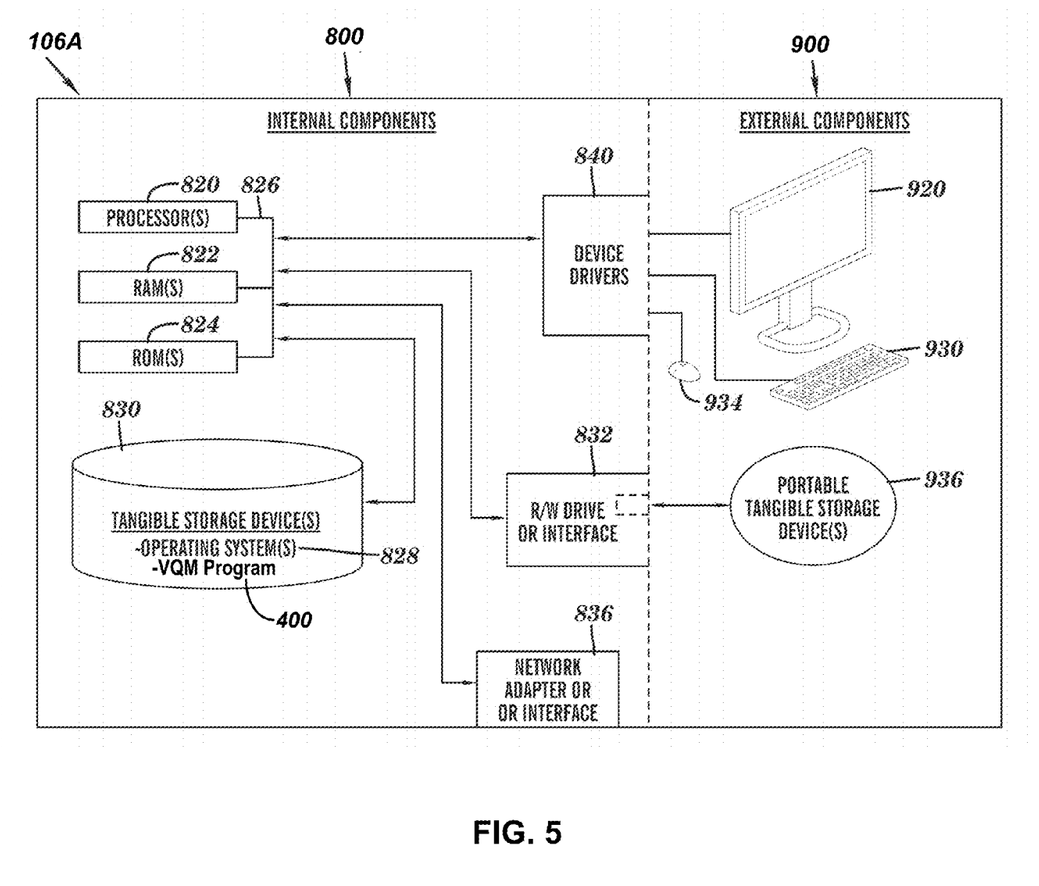
FIG. 5 is a block diagram of hardware and software for executing the process flows of FIG. 4 according to one embodiment.

FIG. 5 shows a block diagram of the components of a data processing system 800, 900, that may be incorporated within VoIP monitoring unit 106A (FIG. 2) in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing system 800, 900 may include may include a set of internal components 800 and a set of external components 900 illustrated in FIG. 5. The set of internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as the VoIP quality monitoring (VQM) program 400 is stored on one or more computer-readable tangible storage devices 830 for execution by one or more processors 820 via one or more RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

The set of internal components 800 also includes a R/W drive or interface 832 to read from and write to one or more portable computer-readable tangible storage devices 936 such as a CD-ROM, DVD, memory stick, magnetic tape, magnetic disk, optical disk or semiconductor storage device. The VQM program 400 can be stored on one or more of the respective portable computer-readable tangible storage devices 936, read via the respective R/W drive or interface 832 and loaded into the respective hard drive 830.

The set of internal components 800 may also include network adapters (or switch port cards) or interfaces 836 such as a TCP/IP adapter cards, wireless wi-fi interface cards, or 3G or 4G wireless interface cards or other wired or wireless communication links. VQM program 400 can be downloaded from an external computer (e.g., server) via a network (for example, the Internet, a local area network or other, wide area network) and respective network adapters or interfaces 836. From the network adapters (or switch port adaptors) or interfaces 836, the VQM program 400 is loaded into the respective hard drive 830. The network may comprise copper wires, optical fibers, wireless transmission, routers, firewalls, switches, gateway computers and/or edge servers.

The set of external components 900 can include a computer display monitor 920, a keyboard 930, and a computer mouse 934. The set of external components 900 can also include touch screens, virtual keyboards, touch pads, pointing devices, and other human interface devices. The set of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A method for calculating a mean opinion score (MOS) during an ongoing Voice over Internet Protocol (VoIP) call, comprising:

receiving a time delay between a call sender at a first location on the communications network and a call receiver at a second location on the communications network;

receiving a recorded first portion of the VoIP call signal originating from the call sender;

receiving a recorded second portion of the VoIP call signal originating from the call receiver, the recorded first portion synchronized with the recorded second portion to correspond to a common call segment associated with the VoIP call between the call sender and the call receiver;

applying an intrusive call quality measurement to the recorded first and the recorded second portion that are synchronized, and generating an output corresponding to the intrusive call quality measurement; and applying a non-intrusive call quality measurement based on receiving the output corresponding to the intrusive call quality measurement and the received time delay;

wherein the synchronizing the first recorded first portion with the recorded second portion comprises:

sending a start recording message from the call sender to the call receiver;

initiating the recording of the recorded first portion of the VoIP call signal originating at the call sender when the start recording message is sent from the call sender to the call receiver; and initiating the recording of the recorded second portion of the VoIP call signal at the call receiver based on the start recording message being received at the call receiver.

2. The method of claim 1, wherein the determining of the time delay comprises:

determining a capture and compression delay value associated with the VoIP source device;

determining a propagation delay value associated with the communications network;

determining a de-jitter buffer delay value associated with the VoIP destination device;

determining a decompression and playback delay value associated with the VoIP destination device; and determining an aggregate value of the capture and compression delay value, the propagation delay value, the de-jitter buffer delay value, and the decompression and playback delay value.

3. The method of claim 1, wherein inputs received by the intrusive call quality measurement comprise:

determining the recorded first call portion; and determining the recorded second call portion.

4. The method of claim 1, wherein inputs received by the non-intrusive call quality measurement comprise:

the calculated first MOS value; and the determined time delay value.

5. The method of claim 1, wherein the intrusive call quality measurement accounts for a packet loss and a jitter value associated with a quality of service (QoS) determination.

6. The method of claim 1, wherein the applying of the intrusive call quality measurement comprises applying one of a perceptual speech quality measure (PSQM) algorithm, a perceptual evaluation of speech quality (PESQ) algorithm, and a perceptual objective listening quality assessment (POLQA) algorithm.

7. The method of claim 1, wherein the applying of the non-intrusive call quality measurement comprises applying an electronic model (E-model) testing algorithm.

* * * * *